United States Patent
Sakuma et al.

(10) Patent No.: US 11,196,535 B2
(45) Date of Patent: Dec. 7, 2021

(54) TIME SYNCHRONIZATION SYSTEM AND TIME SYNCHRONIZATION METHOD

(71) Applicant: Nippon Telegraph and Telephone Corporation, Tokyo (JP)

(72) Inventors: Hiroki Sakuma, Tokyo (JP); Kaoru Arai, Tokyo (JP); Takaaki Hisashima, Tokyo (JP); Ryuta Sugiyama, Tokyo (JP); Shunichi Tsuboi, Tokyo (JP); Osamu Kurokawa, Tokyo (JP); Kazuyuki Matsumura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/264,626

(22) PCT Filed: Jul. 17, 2019

(86) PCT No.: PCT/JP2019/028125
§ 371 (c)(1),
(2) Date: Jan. 29, 2021

(87) PCT Pub. No.: WO2020/026817
PCT Pub. Date: Feb. 6, 2020

(65) Prior Publication Data
US 2021/0314134 A1 Oct. 7, 2021

(30) Foreign Application Priority Data
Aug. 3, 2018 (JP) .............................. JP2018-147122

(51) Int. Cl.
*H04B 10/00* (2013.01)
*H04L 7/00* (2006.01)
(Continued)

(52) U.S. Cl.
CPC ........... *H04L 7/0075* (2013.01); *H04B 10/25* (2013.01); *H04B 10/548* (2013.01); *H04B 10/676* (2013.01)

(58) Field of Classification Search
CPC ....... H04L 7/0075; H04B 10/25; H04B 10/27; H04B 10/40; H04B 10/2507;
(Continued)

(56) References Cited

U.S. PATENT DOCUMENTS

2009/0297164 A1* 12/2009 Horiuchi ............... H04J 3/0682
398/154
2014/0079409 A1* 3/2014 Ruffini .................. H04J 3/0667
398/154
2014/0226992 A1* 8/2014 Takahashi ............... H04L 12/12
398/155

OTHER PUBLICATIONS

Sliwczynski et al., "Fiber Optic Time Transfer For UTC-Traceable Synchronization For Telecom Networks," IEEE Communications Standards Magazine, Mar. 2017, 1(1):66-73.

* cited by examiner

*Primary Examiner* — Hanh Phan
(74) *Attorney, Agent, or Firm* — Fish & Richardson P.C.

(57) ABSTRACT

A local device of a time synchronization system includes a path switching unit that connects respective remote devices using individual optical fibers and switches the respective optical fibers sequentially in a cyclic order, a counter unit, a phase difference memory unit, and a table unit. The counter unit counts a pulse signal P1d demodulated by a PPS demodulation unit to obtain a count value. The phase difference memory unit stores the count value as path information in association with a phase difference detected by a phase detection unit, and outputs the phase difference associated with this path information indicated by the count value to the variable delay unit. When the count value is input, the table unit outputs a path switching signal for
(Continued)

switching to the next optical fiber in the cyclic order to the path switching unit and the path switching unit performs switching to the next optical fiber.

4 Claims, 12 Drawing Sheets

(51) Int. Cl.
*H04B 10/67* (2013.01)
*H04B 10/548* (2013.01)
*H04B 10/25* (2013.01)

(58) Field of Classification Search
CPC .... H04B 10/548; H04B 10/676; H04Q 11/67; H04Q 11/0066; H04Q 11/0005; H04J 3/0658; H04J 3/0667; H04J 3/0682; H04J 3/0697; H04J 3/0638
USPC .... 398/154, 155, 66, 67, 68, 71, 72, 70, 98, 398/99, 100, 58, 102, 45, 48, 49, 158, 398/159, 162, 25, 161, 135, 136; 370/503, 509, 395, 395.5
See application file for complete search history.

TIME SYNCHRONIZATION SYSTEM AND TIME SYNCHRONIZATION METHOD

CROSS-REFERENCE TO RELATED APPLICATIONS

This application is a National Stage application under 35 U.S.C. § 371 of International Application No. PCT/JP2019/028125, having an International Filing Date of Jul. 17, 2019, which claims priority to Japanese Application Serial No. 2018-147122, filed on Aug. 3, 2018. The disclosure of the prior application is considered part of the disclosure of this application, and is incorporated in its entirety into this application.

TECHNICAL FIELD

The present disclosure relates to a time synchronization system and a time synchronization method for synchronizing time with high accuracy between an upper control device of a mobile communication system and wireless base stations present in remote places.

BACKGROUND ART

At present, there is an Optical Time Transfer (OTT) as a time transfer scheme using an arrival timing of an optical pulse transferred through an optical fiber. In a time synchronization system using an OTT, a temporal variation of an arrival timing (a propagation delay) of an optical pulse caused by a change in a length or a refractive index of an optical fiber due to change in temperature is canceled out by a transmission and reception pulse for compensation, thereby realizing highly accurate time synchronization in which a time error is about several tens of pico seconds.

FIG. 11 is a block diagram illustrating a configuration of a time synchronization system in the known art. The time synchronization system 10 illustrated in FIG. 11 has a configuration in which a local device 20 and a remote device 40 are connected by an optical fiber 60.

The local device 20 modulates a carrier signal C0 at 10 MHz with a One Pulse Per Second (1PPS: 1 second pulse) signal that pulses every second, and transmits the modulated signal to the remote device 40 via the optical fiber 60. The carrier signal C0 and a 1PPS signal P0 are transmitted from an oscillator (not illustrated).

The local device 20 includes a PPS modulation unit 21, a phase detection unit 22, a PPS demodulation unit (a demodulation unit) 23, variable delay units 24 and 25, an electrical/optical (E/O) conversion unit 26, an optical/electrical (O/E) conversion unit 27, and a circulator 28.

The remote device 40 includes a circulator 41, an O/E conversion unit 42, an E/O conversion unit 43, and a PPS demodulation unit 44.

In the local device 20, the PPS modulation unit 21 modulates the carrier signal C0 at 10 MHz with the 1PPS signal P0, and outputs the modulated pulse signal P1 to the variable delay unit 24. The variable delay unit 24 delays the pulse signal P1 and outputs the delayed pulse signal P1 to the E/O conversion unit 26, as will be described below. The E/O conversion unit 26 converts the pulse signal P1 after a delay to an optical pulse signal P2. The converted optical pulse signal P2 is transmitted to the optical fiber 60 via the circulator 28.

In the remote device 40, the circulator 41 outputs an optical pulse signal P2a received through the optical fiber 60 to the O/E conversion unit 42. The O/E conversion unit 42 converts the optical pulse signal P2a to an electrical pulse signal P1a and outputs the electrical pulse signal P1a to the PPS demodulation unit 44 and the E/O conversion unit 43. The PPS demodulation unit 44 demodulates a pulse signal P1a and outputs a 1PPS signal P0a and a carrier signal C0a to a communication device (not illustrated) in a posterior stage. The E/O conversion unit 43 converts the pulse signal P1a to an optical pulse signal P2b. The converted optical pulse signal P2b is transmitted to the optical fiber 60 via the circulator 41.

That is, the optical pulse signal P2 transmitted from the local device 20 to the remote device 40 via the optical fiber 60 is sent back from the remote device 40 to the local device 20 via the optical fiber 60. The optical pulse signal P2b sent back is converted to an electrical pulse signal P1b by an O/E conversion unit 27 via the circulator 28, delayed by the variable delay unit 25 as will be described below, and demodulated into the 1PPS signal and a carrier signal C0b by a PPS demodulation unit 23, and only the carrier signal C0b is output to the phase detection unit 22.

Here, because the carrier signal C0b is transferred back and forth via the optical fiber 60, a round-trip propagation delay occurs in the optical fiber 60.

A phase detection unit 22 detects a phase difference φ1 between the carrier signal C0 transmitted to the optical fiber 60 and the carrier signal C0b sent back from the optical fiber 60, and outputs the phase difference φ1 to the variable delay units 24 and 25 on the transmission and reception side. The variable delay unit 24 on the transmission side delays the modulated pulse signal P1 to be transmitted to the optical fiber 60 so that the phase difference φ1 becomes 0 (or constant), and the variable delay unit 25 on the reception side delays the modulated pulse signal P1b sent back from the optical fiber 60 so that the phase difference φ1 becomes 0. Here, 0 also includes substantially 0.

Because this delay causes a phase difference of the optical pulse signal P2 transferred back and forth via the optical fiber 60, which is transmitted from the local device 20 and sent back by the remote device 40, to be zero, time synchronization can be established in time transmission between the local device 20 and the remote device 40. This type of a time synchronization system includes a technique described in Non Patent Literature 1.

CITATION LIST

Non Patent Literature

Non Patent Literature 1: L. Sliwczynski, et al., "Fiber-Optic Time Transfer for UTC-Traceable Synchronization for Telecom Networks", IEEE Comm. Standards Mag., Vol. 1, no. 1, pp. 66-73, 2017.

SUMMARY OF THE INVENTION

Technical Problem

However, in the time synchronization system 10 described above, when time transmission from the local device 20 to the remote devices 40 at multiple locations is performed, it is necessary for the local devices 20 to be connected to the remote devices 40 at the multiple locations on a one-to-one basis using the optical fibers 60, and for a distribution device 62 to distribute a set of 1PPS signal and carrier signal to each local device 20 and transmit the set to the plurality of remote devices 40 via the optical fibers 60, as illustrated in FIG. 12. Thus, because the same number of local devices 20 as the remote devices 40 are required, there is a problem that an equipment cost of the entire time synchronization system 10 is greatly increased.

The present disclosure has been made in view of such circumstances, and an object of the present disclosure is to provide a time synchronization system and a time synchronization method capable of reducing a total equipment cost.

Means for Solving the Problem

As a means for solving the above problem, a disclosure according to first aspect is a time synchronization system including a local device configured to convert a first carrier signal into an optical pulse signal after modulating with a first pulse signal at equal intervals, and transmit the optical pulse signal to a path of an optical fiber, and a remote device configured to receive the optical pulse signal from the path and then send back the optical pulse signal to the local device via the path, the local device delaying a modulated pulse signal to be transmitted using a variable delay unit so that a phase difference between a second carrier signal obtained by demodulating the optical pulse signal that is sent back using a demodulation unit after an electrical conversion and the first carrier signal before the modulation becomes 0 or constant phase difference detected by a phase detection unit, such that time synchronization between the local device and the remote device is established, in which the local device includes a path switching unit configured to connect a plurality of the remote devices using a plurality of the paths of individual optical fibers and sequentially switch among the plurality of the paths that are connected in a predetermined cyclic order, a counter unit configured to count a second pulse signal demodulated by the demodulation unit and output a count value, a phase difference memory unit configured to store the count value as path information in association with the phase difference detected by the phase detection unit, and output, when a count value is input, the phase difference associated with the path information, that is stored, indicated by the count value that is input to the variable delay unit, and a switching table unit configured to output a path switching signal for switching to a next path in the cyclic order to the path switching unit when the count value is input.

A disclosure according to fourth aspect is a time synchronization method for a time synchronization system including a local device configured to convert a first carrier signal at a predetermined frequency into an optical pulse signal after modulating with a first pulse signal at equal intervals, and transmit the optical pulse signal to a path of an optical fiber, and a remote device configured to receive the optical pulse signal from the path and then send back the optical pulse signal to the local device via the path, the local device delaying a modulated pulse signal to be transmitted using a variable delay unit so that a phase difference between a second carrier signal obtained by demodulating the optical pulse signal that is sent back using a demodulation unit after an electrical conversion and the first carrier signal before the modulation becomes 0 or constant phase difference detected by a phase detection unit, such that time synchronization between the local device and the remote device is established, the time synchronization method including, by the local device, connecting a plurality of the remote devices using a plurality of the paths of individual optical fibers and sequentially switching among the plurality of the paths that are connected in a predetermined cyclic order, by the local device, counting a second pulse signal demodulated by the demodulation unit and outputting a count value, by the local device, storing the count value as path information in association with the phase difference detected by the phase detection unit, and outputting, when a count value is input, the phase difference associated with the path information, that is stored, indicated by the count value that is input to the variable delay unit, and, by the local device, performing switching to a next path in the cyclic order when the count value is input.

With this configuration, for example, the count value of the pulse signal that is sent back via the first path is stored as the path information in association with the phase difference. In this case, according to the count value, the path switching signal for switching to the next second path in the cyclic order is output to the path switching unit, and switching to the second path is performed by the path switching unit. When such path switching is sequentially performed and the path is switched to the first path again, a transmission pulse signal is delayed depending on the previously stored phase difference of the first path and the phase difference detected this time approaches 0 or a constant value. When this process is executed a plurality of times, the phase difference detected by the phase detection unit becomes 0 or constant and time synchronization between the local device and all the remote devices can be established.

Because this time synchronization is performed by connecting the plurality of remote devices to one local device with the individual paths, it is not necessary to use as many local devices as the plurality of remote devices, unlike the case of the known art. Thus, it is possible to reduce an equipment cost of the entire time synchronization system.

A disclosure according to second aspect is a time synchronization system including a local device configured to convert a first carrier signal into an optical pulse signal after modulating with a first pulse signal at equal intervals, and transmit the optical pulse signal to a path of an optical fiber, and a remote device configured to receive the optical pulse signal from the path and then send back the optical pulse signal to the local device via the path, the local device delaying a modulated pulse signal to be transmitted using a variable delay unit so that a phase difference between a second carrier signal obtained by demodulating the optical pulse signal that is sent back using a demodulation unit after an electrical conversion and the first carrier signal before the modulation becomes 0 or constant phase difference detected by a phase detection unit, such that time synchronization between the local device and the remote device is established, in which the local device includes a distribution unit configured to connect a plurality of the remote devices using a plurality of the paths of individual optical fibers and distribute and transmit the optical pulse signal to all of the plurality of the remote devices via each of the plurality of the paths that are connected, a counter unit configured to count a second pulse signal obtained by electrically converting the optical pulse signal from the path and output a first count value, and a phase difference memory unit configured to store the first count value as path information in association with the phase difference detected by the phase detection unit, and output, when a first count value is input, the phase difference associated with the path information, that is stored, indicated by the first count value that is input to the variable delay unit, the remote device includes a second demodulation unit configured to demodulate a third pulse signal obtained by electrically converting the optical pulse signal after receiving from the path to obtain the first carrier signal, a second counter unit configured to count a fourth pulse signal that is demodulated and output a second count value, a switching table unit configured to store a pulse number, the pulse number being an arrangement order of pulse signals received by the remote device itself, and output an open instruction signal when a second count value of an identical number with the pulse number that is stored is input from the second counter unit, and an opening and closing switch configured to be in a closed state normally and in an open state for a certain period when the open instruction signal is input, to pass the third pulse signal after the electrical conversion, and the remote device is configured to send back the third pulse signal that passes through the opening and closing switch to the local device via the path identical with the path at the time of transmission from the local device.

A disclosure according to fifth aspect is a time synchronization method for a time synchronization system including a local device configured to convert a first carrier signal into an optical pulse signal after modulating with a first pulse signal at equal intervals, and transmit the optical pulse signal to a path of an optical fiber, and a remote device configured to receive the optical pulse signal from the path and then send back the optical pulse signal to the local device via the path, the local device delaying a modulated pulse signal to be transmitted using a variable delay unit so that a phase difference between a second carrier signal obtained by demodulating the optical pulse signal that is sent back using a demodulation unit after an electrical conversion and the first carrier signal before the modulation becomes 0 or constant phase difference detected by a phase detection unit, such that time synchronization between the local device and the remote device is established, the time synchronization method including, by the local device, connecting a plurality of the remote devices using a plurality of the paths of individual optical fibers and simultaneously transmitting the optical pulse signal to all of the plurality of the remote devices via each of the plurality of the paths that are connected, by the local device, counting a second pulse signal demodulated by the demodulation unit and outputting a first count value, by the local device, storing the first count value as path information in association with the phase difference detected by the phase detection unit, and outputting, when a first count value is input, the phase difference associated with the path information, that is stored, indicated by the first count value that is input to the variable delay unit, by the remote device, demodulating a third pulse signal obtained by electrically converting the optical pulse signal after receiving from the path to obtain the first carrier signal, by the remote device, counting the third pulse signal obtained by electrically converting the optical pulse signal from the path and outputting a second count value, by the remote device, storing a pulse number, the pulse number being an arrangement order of pulse signals received by the remote device itself, and outputting an open instruction signal when a second count value of an identical number with the pulse number that is stored is input, by the remote device, causing the third pulse signal after the electrical conversion to pass through an opening and closing switch configured to be in a closed state normally and in an open state for a certain period when the open instruction signal is input, and by the remote device, sending back the third pulse signal that is passed to the local device via the path identical with the path at the time of transmission from the local device.

With this configuration, in the remote device, only when the count value of the received pulse signal is the same as the pulse number stored in the table unit, the received pulse signal passes through the opening and closing switch opened according to the open instruction signal and is sent back to the local device. In this case, in other remote devices, because the same pulse number as the count value is not stored in the table unit, the sending back is not performed. That is, when one pulse signal is transmitted to all the remote devices, sending back of the pulse signal is performed in only the remote devices corresponding to the pulse signal.

The following operation is performed in the local device. It is assumed that, for example, the pulse signal is transmitted to all the paths and the pulse signal is sent back from only the first remote device to the local device via the first path. The local device stores, as path information, the count value of the pulse signal that is sent back in the phase difference memory unit in association with the phase difference. Thereafter, when the pulse signal is sent back again from the first remote device via the first path, the transmission pulse signal is delayed depending on the previously stored phase difference of the first path, and the phase difference detected this time approaches 0 or a constant value. When this process is executed a plurality of times, the phase difference detected by the phase detection unit becomes 0 or constant and time synchronization between the local device and all the remote devices can be established.

Because this time synchronization is performed by connecting the plurality of remote devices to one local device with the individual paths, it is not necessary to use as many local devices as the plurality of remote devices, unlike the case of the known art. Thus, it is possible to reduce an equipment cost of the entire time synchronization system.

A disclosure according to third aspect is the time synchronization system according to first or second aspect, in which the local device further includes a multiplication unit configured to multiply a frequency of the pulse signal for modulating the carrier signal.

With this configuration, a timing to delay the pulse signal is reflected in path switching at the next time after the phase difference for delay is obtained. Here, a variation in a length or a refractive index due to change in temperature of the optical fiber, which is a path, changes over time. For this reason, when the frequency of the pulse signal is low, it takes time until the path is switched and then becomes its own path again, and a variation in the length or the refractive index of the optical fiber changes from the previous time. Thus, because a switching time of each path is shortened when the frequency of the pulse signal is multiplied and increased, switching to its own path is performed in a short time, as in the present disclosure. This allows an effect of delaying the pulse signal to be transmitted so that the phase difference becomes 0 or constant to be more appropriately reflected.

Effects of the Invention

According to the present disclosure, it is possible to provide a time synchronization system and a time synchronization method that reduce a total equipment cost.

DESCRIPTION OF EMBODIMENTS

Hereinafter, embodiments of the present disclosure will be described with reference to the drawings. Here, in all the drawings of the present specification, components having corresponding functions are denoted by the same reference signs and description thereof will be appropriately omitted.

Configuration of First Embodiment

Figure 1:
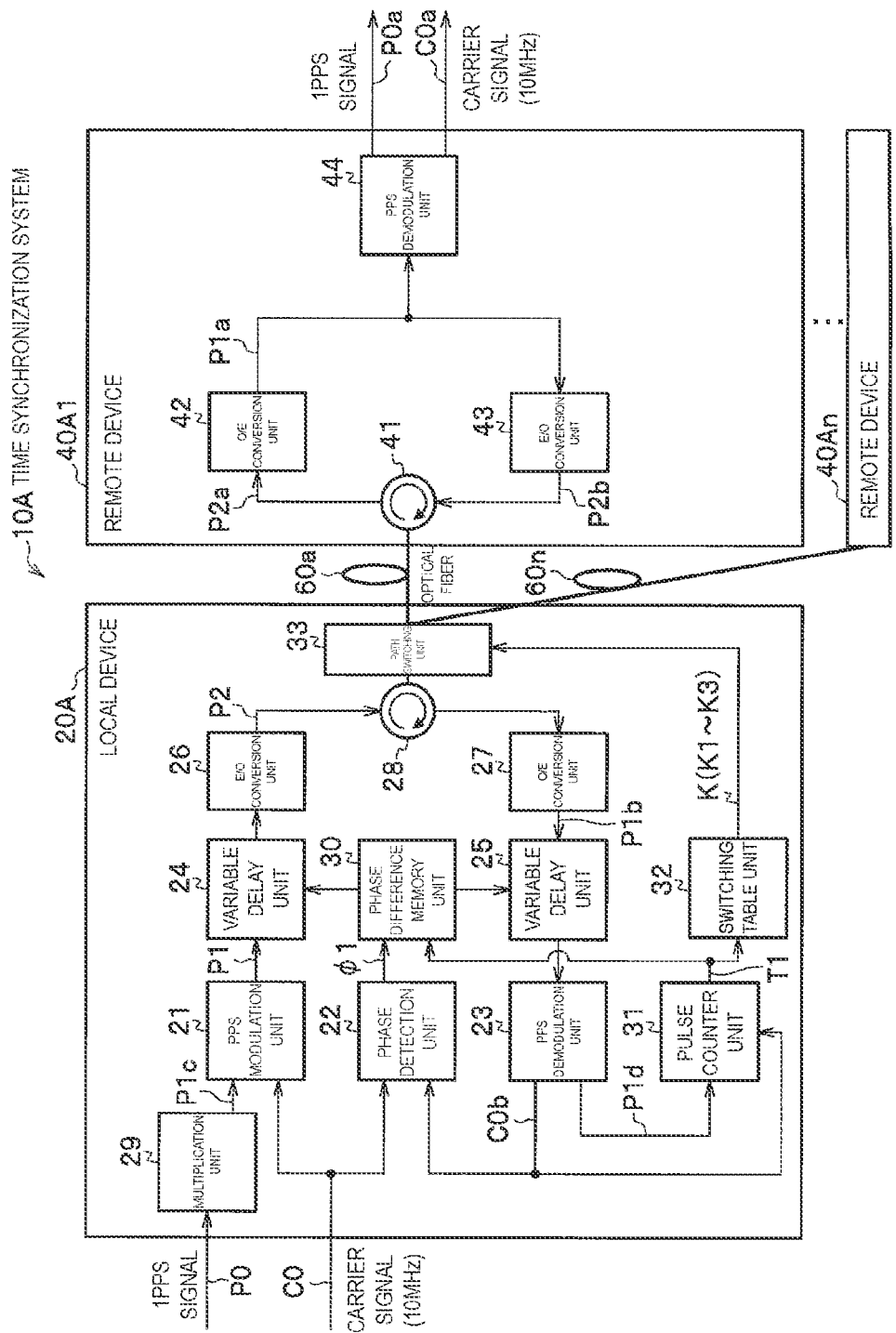
FIG. 1 is a block diagram illustrating a configuration of a time synchronization system according to a first embodiment of the present disclosure.

FIG. 1 is a block diagram illustrating a configuration of a time synchronization system according to a first embodiment of the present disclosure.

Figure 11:
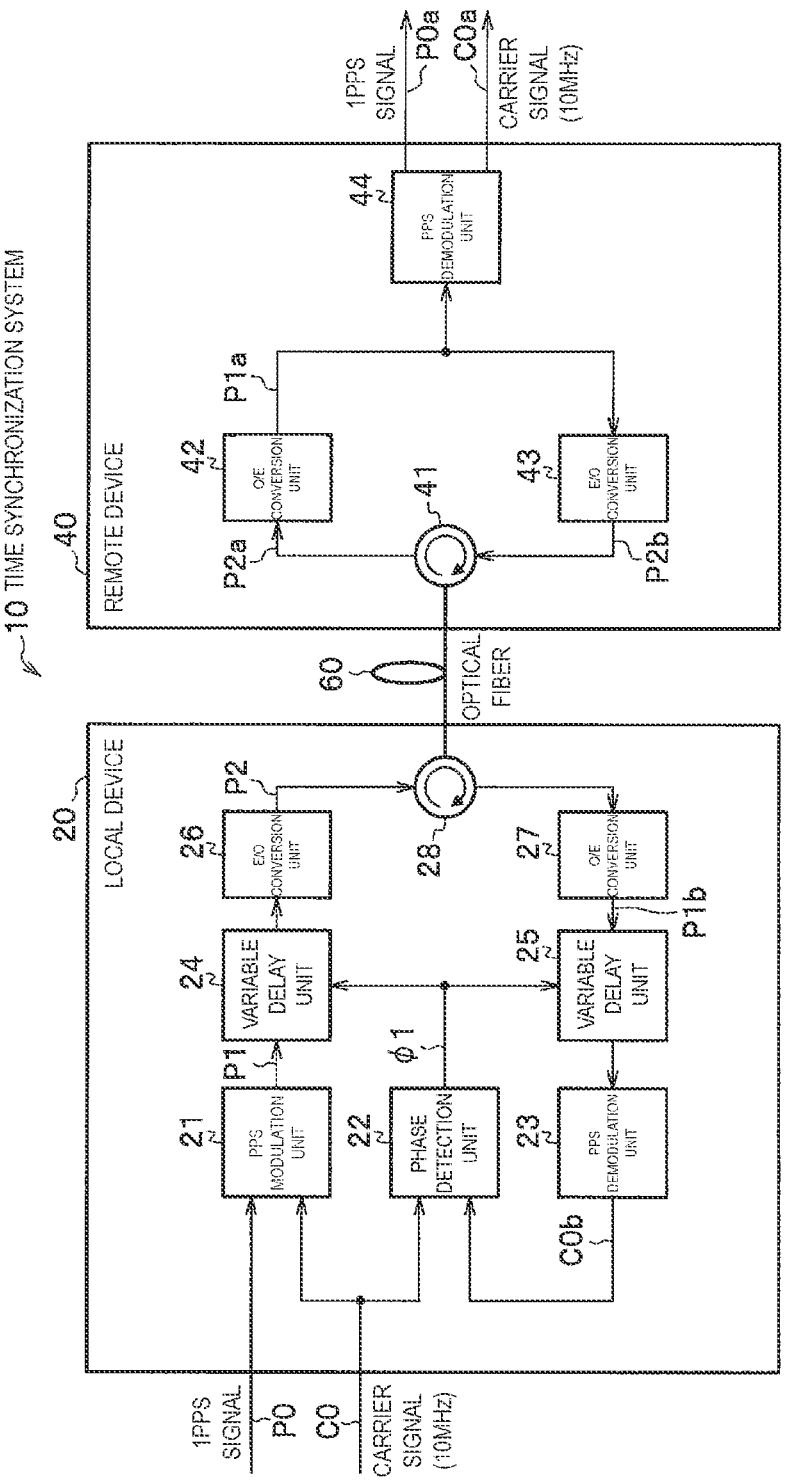
FIG. 11 is a block diagram illustrating a configuration of a time synchronization system in the known art.
Figure 12:
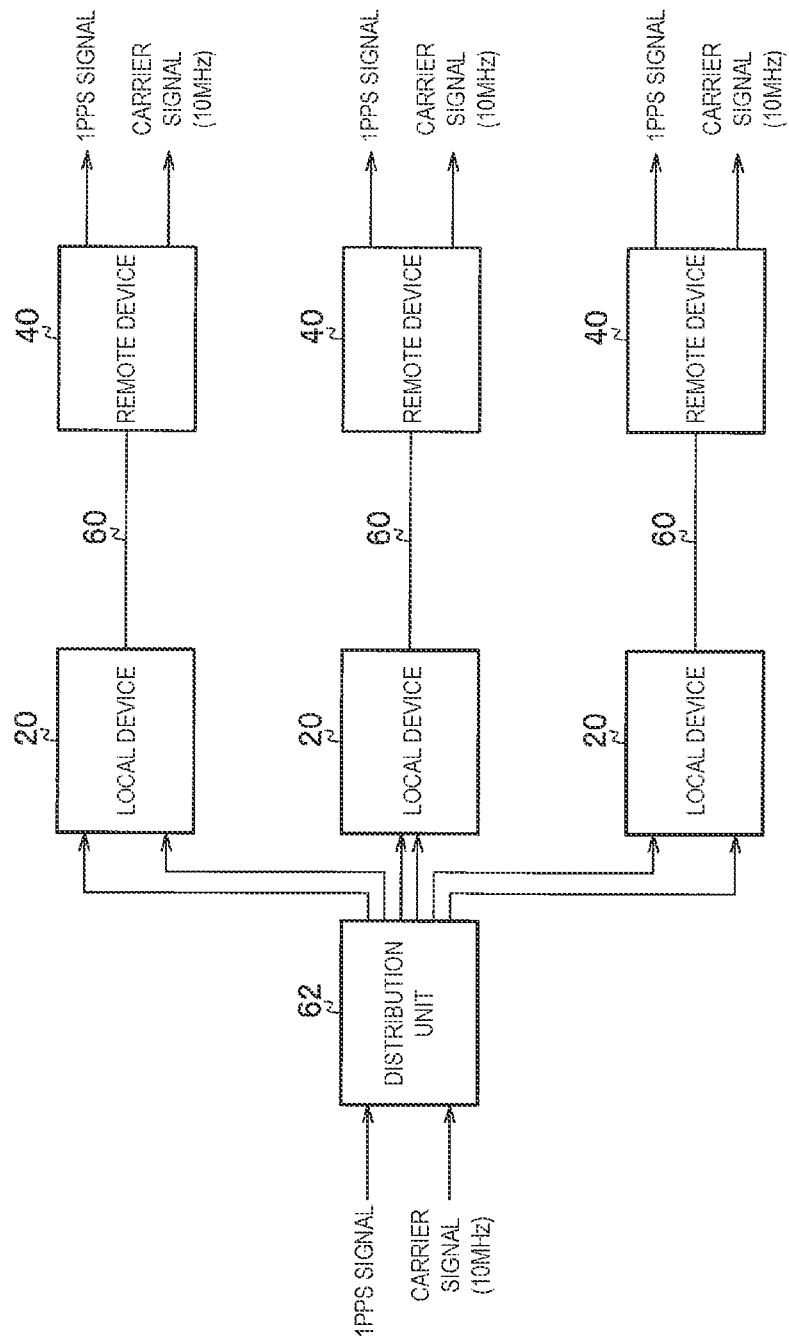
FIG. 12 is a block diagram illustrating a configuration in which local devices are connected to each of a plurality of remote devices by an optical fiber in the time synchronization system in the known art.

A time synchronization system 10A illustrated in FIG. 1 differs from the time synchronization system 10 in the known art (FIG. 11) in that a plurality of remote devices 40A1 to 40An are connected to one local device 20A by optical fibers 60a to 60n so that time synchronization can be established between transmission and reception. The local device 20A includes a multiplication unit 29, a phase difference memory unit 30, a pulse counter unit 31, a switching table unit 32, and a path switching unit 33, in addition to the components of the local device 20 of the known art (FIG. 11).

A plurality of remote devices 40A1 to A1n having the same configuration are connected to the path switching unit 33 connected to the circulator 28 of the local device 20A via the individual optical fibers 60a to 60n. Each of the remote devices 40A 1 to 40An has the same configuration as the remote device 40 (FIG. 11) described above.

The path switching unit 33 sequentially switches the optical fibers 60a to 60n as paths to sequentially connect the local device 20A to the different remote devices 40A1 to 40An. In this case, the path switching unit 33 switches the path according to a path switching signal K output from a switching table unit (also referred to as a table unit) 32 to be described below. Further, the path switching unit 33 outputs the optical pulse signal P2b to the circulator 28 when the optical pulse signal P2b is sent back from the optical fibers 60a to 60n.

The multiplication unit 29 multiplies a frequency of the input 1PPS signal P0 and outputs a multiplied pulse signal P1c to the PPS modulation unit 21. For example, the multiplication unit 29 multiplies a frequency of 1 Hz of the 1PPS signal P0 to 10 Hz seconds.

A pulse counter unit (also referred to as a counter unit) 31 performs a counting operation according to the carrier signal C0b at 10 MHz demodulated by the PPS demodulation unit 23, counts the demodulated pulse signal P1d, and outputs a count value T1 to the phase difference memory unit 30 and the table unit 32. That is, the counter unit 31 counts the pulse signal P1d that is sent back from each path (each of the optical fibers 60a to 60n) switched by the path switching unit 33 and obtains the count value T1 for each path.

Figure 2:
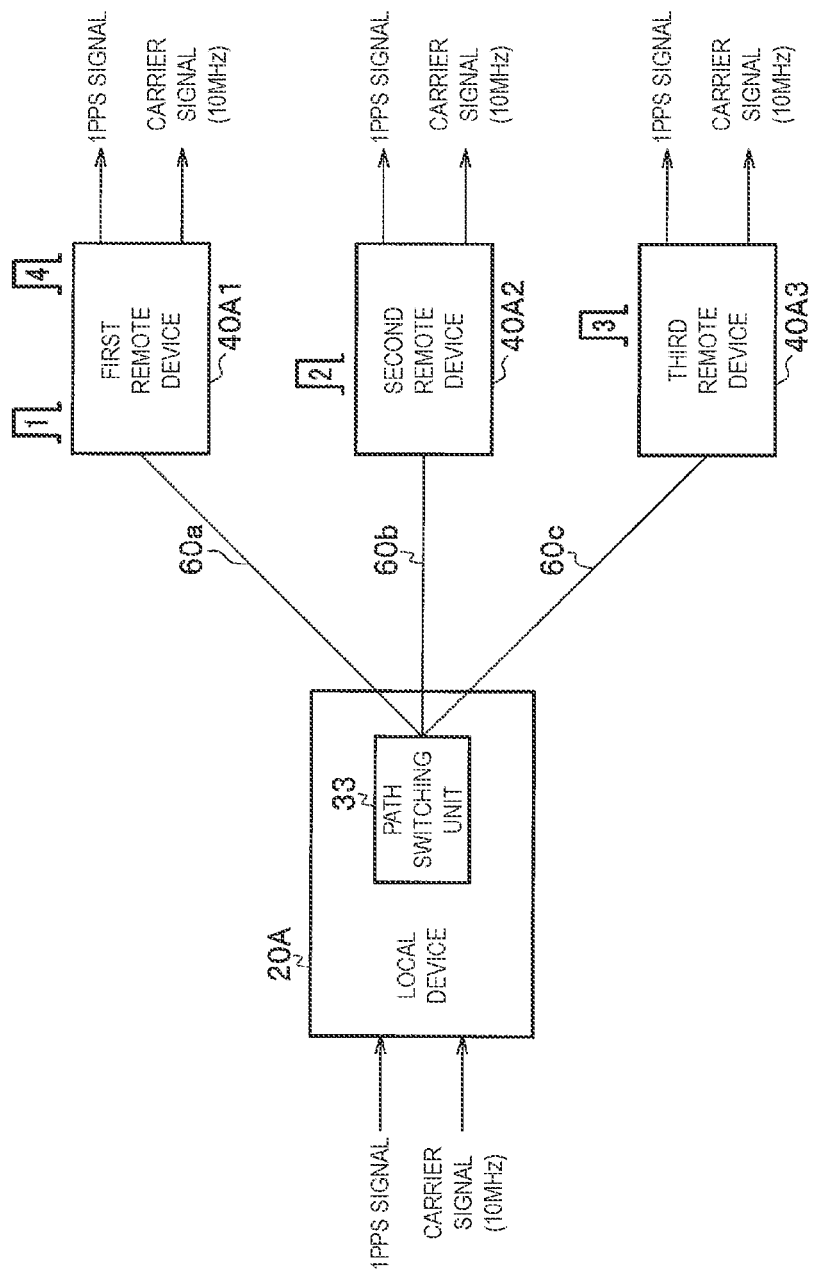
FIG. 2 is a block diagram illustrating a configuration in which a local device and three remote devices are connected by optical fibers in the time synchronization system of the first embodiment.

The phase difference memory unit 30 stores the count value T1 for each path and a phase difference φ1 detected by the phase detection unit 22 for each path in association with each other. For example, it is assumed that there are three optical fibers 60a to 60c as three paths connected to three remote devices 40A1, 40A2, 40A3, as illustrated in FIG. 2.

In this case, the same path is indicated every 3 counts, that is for example, the count value T1="1" indicates the first optical fiber 60a, "2" indicates the second optical fiber 60b, "3" indicates the third optical fiber 60c, and then, "4" indicates the first optical fiber 60a, "5" indicates the second optical fiber 60b, and "6" indicates the third optical fiber 60c. That is, the count value T1 becomes path information unique to a path. For example, the count value T1 of the first optical fiber 60a becomes a numerical value (path information of the first path 60a) that is incremented by 3 from "1" such as "1", "4", and "7" and the phase difference φ1 detected at the time of counting is associated with each numerical value.

The phase difference memory unit 30 outputs the phase difference φ1 associated with the count value T1 (for example, "1", "4", "7" . . . that are count values indicating the first optical fiber 60a) stored when a previous path has been switched to the same optical fiber, when the path is switched by the path switching unit 33 (for example, when the path is switched to the first optical fiber 60a) to the transmission and reception side and the variable delay units 24 and 25. Accordingly, the pulse signal P1 transmitted to the first optical fiber 60a is delayed by the variable delay unit 24 on the transmission side depending on the phase difference φ1. Thus, a transmission timing of the pulse signal P1 is adjusted. On the other hand, the pulse signal P1b that is sent back from the first optical fiber 60a is delayed by the variable delay unit 25 on the reception side depending on the phase difference φ1.

This delay is sequentially repeated every three counts so that the phase difference φ1 output from the phase detection unit 22 becomes 0 (or constant). For example, a delay of the pulse signal P1 relevant to the first optical fiber 60a is performed every three counts, like "1", "4", and "7" of the count value T1.

Here, the pulse signal P1 to be transmitted to the first optical fiber 60a may be delayed depending on the phase difference φ1 so that the transmission timing is adjusted using only the variable delay unit 24 on the transmission side.

As a result of the delay, the phase difference of the optical pulse signal P2 transmitted from the local device 20A via the first optical fiber 60a and received by the remote device 40A1 becomes 0 (or constant), and thus, time synchronization can be established between the local device 20A and the remote device 40A1.

In the table unit 32, the path switching signal K is associated with the count value T1 for each path. For example, in the case of the three paths described above, a path switching signal K2 indicating switching to the second optical fiber 60*b* is associated with count values "1", "4", "7", . . . indicating the first optical fiber 60*a*, and the path switching signal K2 is output to the path switching unit 33 when the count value T1 becomes "1", for example. This allows the path switching unit 33 to perform switching to the second optical fiber 60*b*.

Similarly, in the table unit 32, a path switching signal K3 indicating switching to the third optical fiber 60*c* is associated with the count values "2", "5", "8", . . . indicating the second optical fiber 60*b*, and when the count value T1 becomes "2", for example, the path switching signal K3 is output to the path switching unit 33, and switching to the third optical fiber 60*c* is performed.

In the table unit 32, a path switching signal K1 indicating switching to the first optical fiber 60*a* is associated with the count values "3", "6", "9", . . . indicating the third optical fiber 60*c*, and when the count value T1 becomes "3", for example, the path switching signal K1 is output to the path switching unit 33, and switching to the first optical fiber 60*a* is performed.

As another example, the path switching signal K for switching to the next path in a predetermined switching order may be transmitted each time the count value T1 is input from the counter unit 31 to the table unit 32.

Operation of First Embodiment

Next, an operation of the time synchronization system 10A according to the first embodiment will be described with reference to a timing chart of FIG. 3. Here, a pulse signal relevant to transmission and reception between the local device 20A and the remote devices 40A1 to 40A3 illustrated in FIG. 2 is simply referred to as a pulse. It is assumed that the pulse is transmitted from the local device 20A in a cyclic order of the first optical fiber 60*a*, the second optical fiber 60*b*, and the third optical fiber 60*c*.

Figure 3:
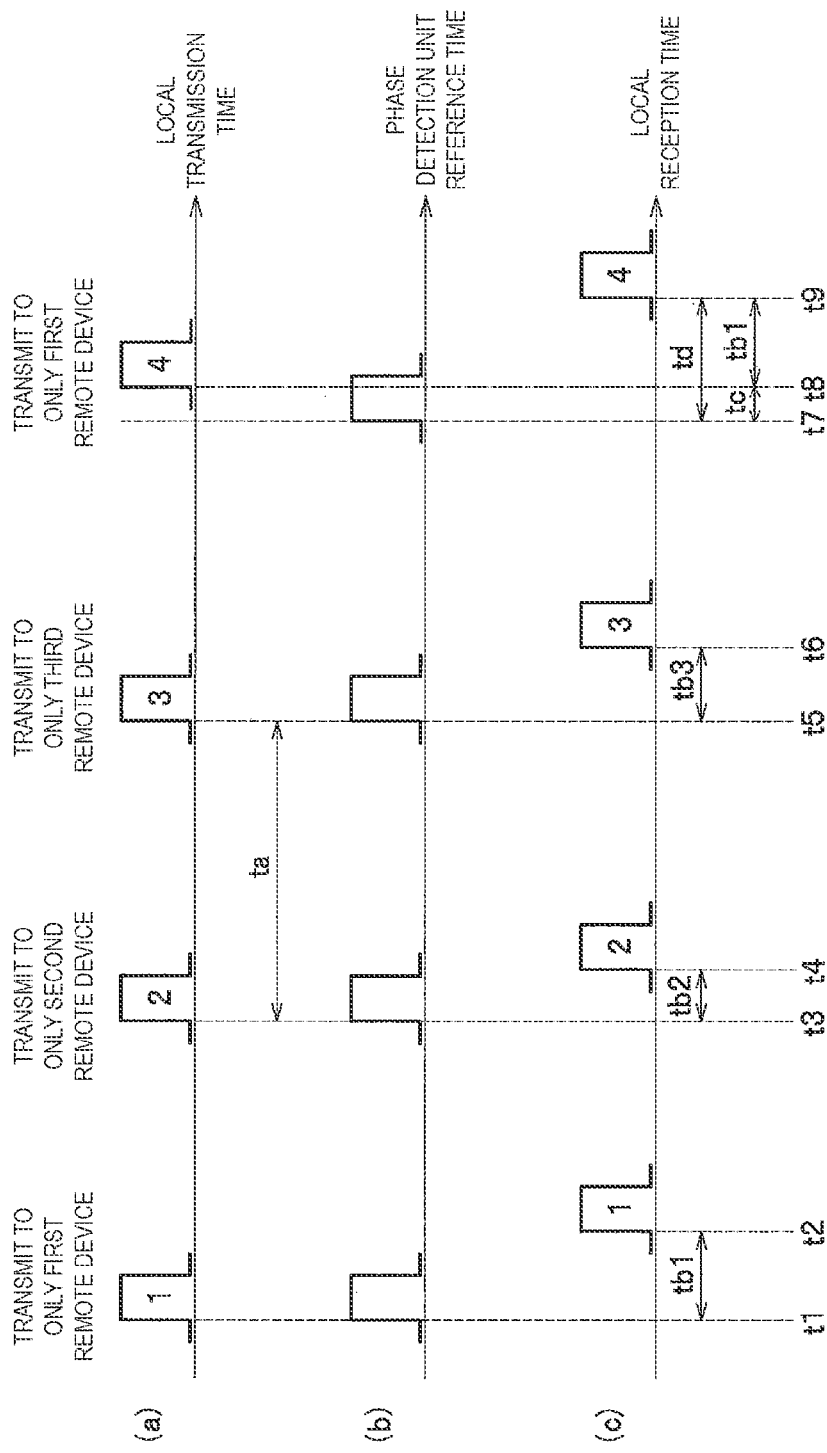
FIG. 3 is a timing chart illustrating an operation of the time synchronization system of the first embodiment.

A period interval of rising times t1, t3, t5, and t7 of a pulse waveform illustrated in FIG. 3(*b*) is an interval ta of the reference time when phase difference detection of the phase detection unit 22 is performed. It is assumed that this time interval ta is one second interval that is the same as a pulse interval of the 1PPS signal P0. Here, the time interval ta can be variable through a multiplication operation of the 1PPS signal P0 in the multiplication unit 29 (FIG. 1).

At time t1 illustrated in FIG. 3(*a*), it is assumed that the local device 20A transmits a first pulse 1 to the first remote device 40A1 via the first optical fiber 60*a*. It is assumed that the first transmission pulse 1 is received (see FIG. 2) by the first remote device 40A1, sent back, and received in the local device 20A via the first optical fiber 60*a* at time t2 illustrated in FIG. 3(*c*). The reception time t2 is a time delayed from the transmission time t1 by a round-trip propagation delay time tb1 of the first optical fiber 60*a*.

However, the round-trip propagation delay time tb1 is not constant and changes depending on the propagation delay time caused by the change in the length and the refractive index of the first optical fiber 60*a* due to a change in temperature of an optical fiber of the first optical fiber 60*a*. The round-trip propagation delay time tb1 is about $1 \times 10^{-4}$ seconds when a length of the first optical fiber 60*a* is 10 km.

The phase difference φ1 between the carrier signal C0 at the reference time detected by the phase detection unit 22 (FIG. 1) after the send-back pulse 1 is received and the carrier signal C0*b* demodulated from the send-back pulse 1 changes depending on the round-trip propagation delay time tb1.

The variable delay unit 24 on the transmission side delays the transmission pulse 1 and the variable delay unit 25 on the reception side delays the send-back pulse 1 depending on the phase difference φ1 so that the change becomes 0 (or constant). This delay of, for example, the pulse 1 relevant to the first optical fiber 60*a* is performed as follows at the time of transmission and send-back of the second pulse 1. That is, a time tc between time t7 and time t8 illustrated in FIG. 3(*c*) becomes a delay time due to the variable delay units 24 and 25 on the transmission and reception sides. However, only the variable delay unit 24 on the transmission side may delay the pulse 1 by the delay time tc depending on the phase difference φ1.

The phase difference φ1 obtained by transmitting the first pulse 1 is stored in the phase difference memory unit 30 in association with the first count value T1="1" in the counter unit 31. The count value "1" is also input to the table unit 32. At the time of this input, the table unit 32 transmits, to the path switching unit 33, the path switching signal K2 for switching to the next second optical fiber 60*b* in a predetermined cyclic order. This allows the path switching unit 33 to perform switching to the second optical fiber 60*b*. Thus, the local device 20A is connected to the second remote device 40A2 via the second optical fiber 60*b*.

After this switching, the local device 20A transmits the second pulse 2 to the second optical fiber 60*b* at time t3. A first transmission pulse 2 relevant to the second optical fiber 60*b* is received by the second remote device 40A2 (see FIG. 2), sent back via the second optical fiber 60*b*, and received by the local device 20A at time t4. This reception time t4 is a time delayed from the transmission time t3 by a round-trip propagation delay time tb2 of the second optical fiber 60*b*.

Further, the count value T1="2" obtained by the counter unit 31 counting a send-back pulse 2 received at time t4 and demodulated is input to the phase difference memory unit 30 and the table unit 32. The phase difference memory unit 30 stores the count value "2" and the phase difference φ1 from the phase detection unit 22 in association with each other. The table unit 32 transmits, to the path switching unit 33, the path switching signal K3 for switching to the third optical fiber 60*c* in the next order of the cyclic order in response to the input of the count value "2". This allows the path switching unit 33 to connect the local device 20A to the third remote device 40A3 via the third optical fiber 60*c*.

After this switching, the local device 20A transmits a third pulse 3 to the third optical fiber 60*c* at time t5. A first transmission pulse 3 relevant to the third optical fiber 60*c* is received by the third remote device 40A3 (see FIG. 2), sent back via the third optical fiber 60*c*, and received by the local device 20A at time t6. This reception time t6 is a time delayed from the transmission time t5 by a round-trip propagation delay time tb3 of the third optical fiber 60*c*.

Further, the count value T1="3" obtained by counting a send-back pulse 3 received at time t6 and demodulated is input to the phase difference memory unit 30 and the table unit 32. The phase difference memory unit 30 stores the count value "3" and the phase difference φ1 in association with each other. The table unit 32 transmits, to the path switching unit 33, the path switching signal K1 for switching to the first optical fiber 60*a* in the next order of the cyclic order in response to the input of the count value "3". This allows the path switching unit 33 to connect the local device 20A to the first remote device 40A1 via the first optical fiber 60a.

Then, the local device 20A transmits a fourth pulse 4 to the first remote device 40A1 via the first optical fiber 60a as follows at time t8. That is, in fourth transmission, the phase difference φ1 associated with the first count value "1" stored in the table unit 32 is output to the variable delay units 24 and 25 on the transmission and reception side. The variable delay unit 24 on the transmission side delays the transmission pulse 4 from a reference time t7, which is an original transmission time, by the time tc depending on the phase difference φ1. At time t8 adjusted by this delay, the transmission pulse 4 is transmitted to the first optical fiber 60a.

An adjustment range of the transmission timing in which an original transmission time t7 is adjusted to be time t8 is about $1 \times 10^1$ seconds when the length of the first optical fiber 60a is 10 km.

A fourth transmission pulse 4 relevant to the first optical fiber 60a is received by the first remote device 40A1 (see FIG. 2) and then sent back via the first optical fiber 60a, and the pulse 4 that is sent back is received in the local device 20A at time 9. This reception time t9 is a time delayed from the original transmission time t7 by a time td obtained by adjusting the round-trip propagation delay time tb1 of the first optical fiber 60a with the delay time tc at the time of transmission. When this adjustment is continuously performed, the phase difference 91 becomes 0 or constant, and the local device 20A and the first remote device 40A1 are time-synchronized. This also applies to the other remote devices 40A2 and 40A3.

Further, the count value T1="4" obtained by counting a send-back pulse 2 received at time t9 and demodulated is input to the phase difference memory unit 30 and the table unit 32. The phase difference memory unit 30 stores the count value "4" indicating the first optical fiber 60a and the phase difference φ1 in association with each other. The table unit 32 outputs the path switching signal K2 for switching to the second path 60b in the next order of the cyclic order in response to the input of the count value "4", and in response thereto, the path switching unit 33 performs switching to the second optical fiber 60b. The same operation is then performed.

Effects of First Embodiment

Effects of the time synchronization system 10A according to the first embodiment will be described. This time synchronization system 10A includes the local device 20A that modulates the carrier signal C0 at a predetermined frequency with the 1PPS signal P0, converts the signal to the optical pulse signal P2, and transmits the optical pulse signal P2 to the optical fiber 60, and the remote device 40A that receives the optical pulse signal P2 from the optical fiber 60 and then sends back the optical pulse signal P2 to the local device 20A via the optical fiber 60. The local device 20A establishes time synchronization with the remote devices 40A1 to 40An based on characteristics to be described below. The local device 20A delays the pulse signal P1 using the variable delay unit when transmitting the pulse signal P1 to perform the adjustment so that a value of the phase difference el between the demodulated carrier signal C0b and the carrier signal C0 before modulation to be described below is 0 or constant. Here, the carrier signal C0b is obtained by demodulating the optical pulse signal P2 that is sent back using the PPS demodulation unit 23 after performing conversion to an electrical signal on the optical pulse signal P2. Here, the phase difference φ1 is detected by the phase detection unit 22. The time synchronization system 10A has the following characteristic configuration.

(1) The local device 20A includes the path switching unit 33, and further includes the counter unit 31, the phase difference memory unit 30, and the table unit 32. The plurality of remote devices 40A 1 to 40An are connected to the path switching unit 33 by the individual optical fibers 60a to 60n, and the connected optical fibers 60a to 60n are sequentially switched by the path switching unit 33 in a predetermined cyclic order.

The counter unit 31 counts the pulse signal P1d demodulated by the PPS demodulation unit 23 and outputs the count value T1. The phase difference memory unit 30 stores the count value T1 as path information in association with the phase difference el detected by the phase detection unit 22, and outputs the phase difference φ1 associated with the stored path information to the variable delay unit 24 when the count value T1 indicating the same path information is input. When the count value T1 is input, the switching table unit 32 outputs a path switching signal K for switching to the next optical fiber (for example, the optical fiber 60b) in the cyclic order to the path switching unit 33. The path switching unit 33 performs switching to the optical fiber 60b according to the path switching signal K.

With this configuration, for example, the count value T1 of the pulse signal P1d sent back by the first optical fiber 60a is stored as the path information in the phase difference memory unit 30 in association with the phase difference φ1. In this case, by the count value T1, the path switching signal K for switching to the next second optical fiber 60 in the cyclic order is output to the path switching unit 33, and switching to the second optical fiber 60b is performed by the path switching unit 33. When such path switching is sequentially performed and the path is switched to the first optical fiber 60a again, the transmission pulse signal P1 is delayed depending on the previously stored phase difference φ1 of the first optical fiber 60 and the phase difference φ1 detected this time approaches 0 or a constant value. When this process is executed a plurality of times, the phase difference φ1 detected by the phase detection unit 22 becomes 0 or constant. This allows the local device 20A to establish the time synchronization with the remote devices 40A1, 40A2, and 40A3.

Because the time synchronization is performed by connecting the plurality of remote devices 40A1, 40A2, and 40A3 to one local device 20A with the individual optical fibers 60, it is not necessary to use as many local devices 20A as the plurality of remote devices 40A1, 40A2, and 40A3, unlike the case of the known art. Thus, it is possible to reduce an equipment cost of the entire time synchronization system.

Further, the time synchronization system 10A has the following characteristic configuration, in addition to (1).

(2) The time synchronization system 10A further includes the multiplication unit 29 that multiplies the frequency of the 1PPS signal P0 for modulating the carrier signal C0.

With this configuration, a timing to delay the pulse signal P1 is reflected in path switching of the next time after the phase difference el for delay is obtained. Here, a variation in the length or the refractive index due to change in temperature of the optical fiber 60, which is a path, changes over time. For this reason, when a frequency of the pulse signal P1 is low, it takes time until the optical fiber 60 is switched and then the path returns to the optical fiber 60 that is its own path, and a variation in the length or the refractive index of the optical fiber 60 changes from the previous time. Thus, because a switching time of each of the optical fibers 60a to 60n is shortened when the frequency of the 1PPS signal P0 is multiplied and increased, switching to its own path is performed in a short time, as in the present embodiment. This allows an effect of delaying the pulse signal to be transmitted so that the phase difference φ1 becomes 0 or constant to be more appropriately reflected in the time synchronization.

Configuration of Second Embodiment

Figure 4:
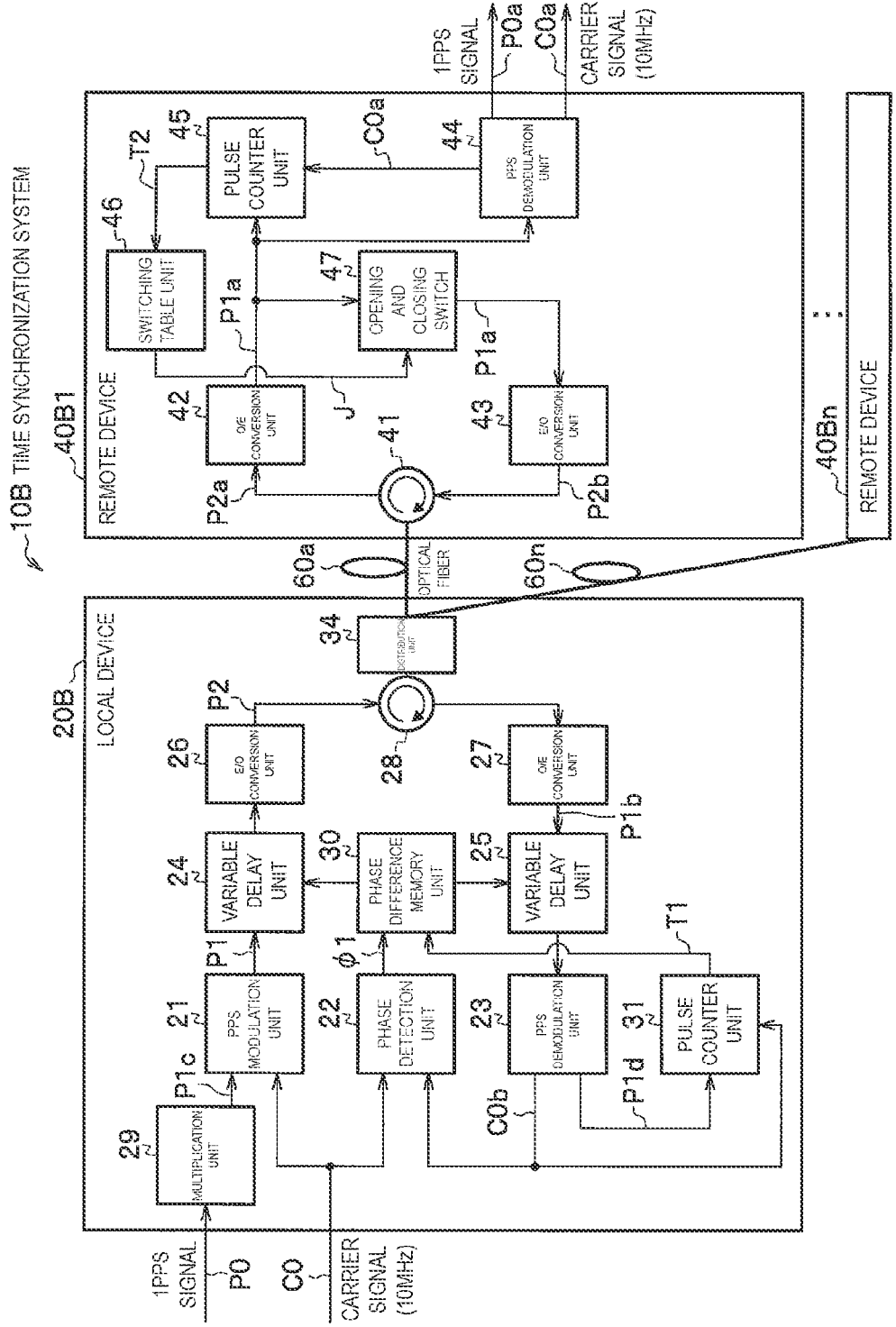
FIG. 4 is a block diagram illustrating a configuration of a time synchronization system according to a second embodiment of the present disclosure.

FIG. 4 is a block diagram illustrating a configuration of a time synchronization system according to a second embodiment of the present disclosure.

In a time synchronization system 10B illustrated in FIG. 4, a plurality of remote devices 40B1 to 40Bn are connected to one local device 20B by optical fibers 60a to 60n so that time synchronization can be established between transmission and reception, as in time synchronization system 10A of the first embodiment (FIG. 1).

The time synchronization system 10B includes a multiplication unit 29, a phase difference memory unit 30, a pulse counter unit 31, and a distribution unit 34, in addition to the components of the local device 20 of the known art (FIG. 11). Further, the remote devices 40B1 to 40Bn include a pulse counter unit 45, a switching table unit 46, and an opening and closing switch 47, in addition to the components of the local device 20 of the known art (FIG. 11).

A plurality of remote devices 40B1 to 40B1n having the same configuration are connected to the distribution unit 34 connected to the circulator 28 of the local device 20B via individual optical fibers 60a to 60n. The distribution unit 34 transmits the optical pulse signal P2 to all the remote devices 40A1 to 40An via all the optical fibers 60a to 60n, as will be described below. That is, the pulse 1 at one-second intervals is simultaneously transmitted as the optical pulse signal P2 to all the remote devices 40A1 to 40An. Then, the pulse 2 and the pulse 3 are transmitted to all the remote devices 40A1 to 40An sequentially and simultaneously. Thus, the pulses are transmitted simultaneously and sequentially.

The above configuration will be described on behalf of the remote device 40B1 because the remote devices 40B1 to 40B1n have the same configuration.

The PPS demodulation unit 44 demodulates the pulse signal P1a subjected to conversion to an electrical signal by the O/E conversion unit 42, transmits the 1PPS signal P0a and the carrier signal C0a at 10 MHz to a communication device (not illustrated) in a posterior stage, and outputs the carrier signal C0a to the counter unit 45.

The counter unit 45 performs a counting operation according to the demodulated carrier signal C0a to count the pulse signal P1a converted to an electrical signal by the O/E conversion unit 42, and outputs a count value T2 to the table unit 46.

The switching table unit 46 stores a number that is an arrangement order of pulse signals (referred to as a pulse number) received by its own remote device 40B1, and outputs an open instruction signal J to the opening and closing switch 47 when a count value T2 of the same number as the stored pulse number is input.

Figure 5:
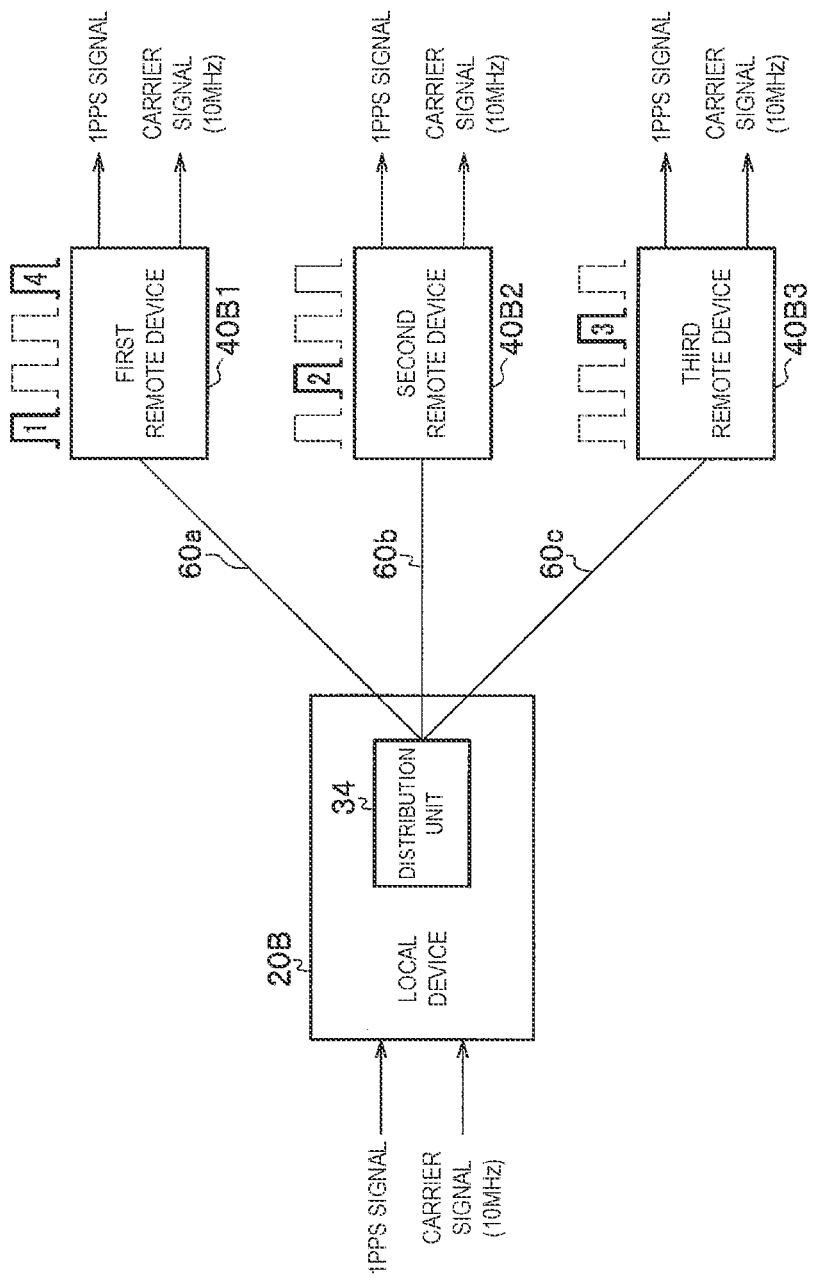
FIG. 5 is a block diagram illustrating a configuration in which a local device and three remote devices are connected by optical fibers in the time synchronization system of the second embodiment.

It is assumed that, for example, the first to third remote devices 40B1 to 40B3 are connected to the local device 20B by optical fibers 60a to 60c, as illustrated in FIG. 5. In this case, the table unit 46 of the first remote device 40B1 stores, for example, pulse numbers "1", "4", "7", . . . that is increased by 3 from "1", which is an arrangement order of the pulse signals received by the remote device 40B1.

The switching table unit 46 of the second remote device 40B2 stores, for example, the pulse numbers "2", "5", "8", . . . that is increased by 3 from "2", which is the arrangement order of the pulse signals received by the own remote device 40B2. The table unit 46 of the third remote device 40B3 stores, for example, pulse numbers "3", "6", "9", . . . that is increased by 3 from "3", which is the arrangement order of the pulse signals received by the remote device 40B3. Regarding the storage of the pulse numbers, only an initial number may be stored, and the pulse number may be increased by 3 and stored each time a count value T2 of the initial number is input.

The opening and closing switch 47 is normally closed, and is opened for a certain period to pass the pulse signal P1a to the E/O conversion unit 43 so that the pulse signal P1a is output when the open instruction signal J is input. That is, when the opening and closing switch 47 is opened, the pulse signal P1a received from the local device 20B is converted to an optical signal by the E/O conversion unit 43, and then sent back to the local device 20B via the optical fiber 60a. The optical pulse signal P2b that is sent back is output from the distribution unit 34 to the circulator 28.

Operation of Second Embodiment

Figure 6:
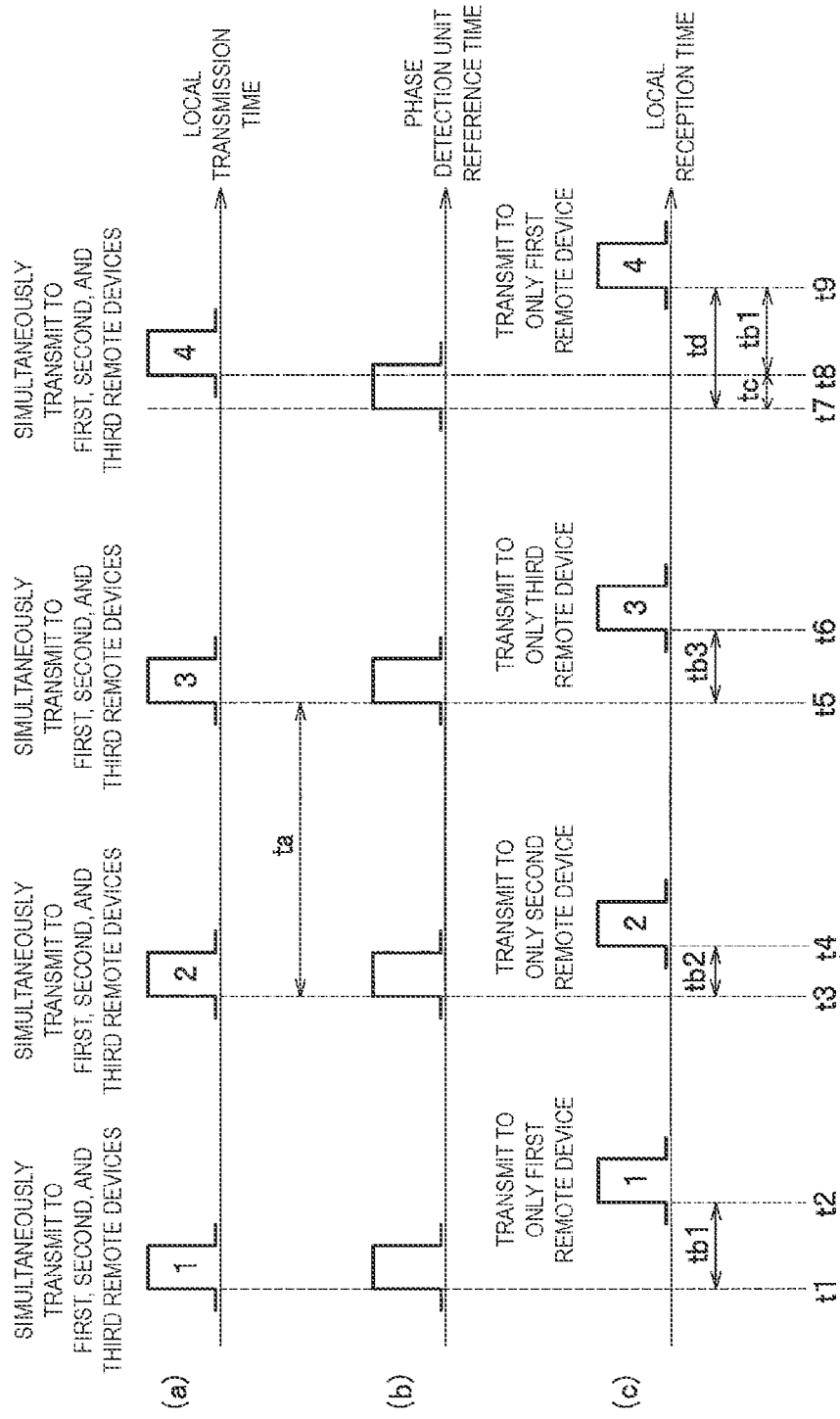
FIG. 6 is a timing chart illustrating an operation of the time synchronization system of the first embodiment.

Next, an operation of the time synchronization system 10B according to the second embodiment will be described with reference to a timing chart of FIG. 6. Here, a pulse signal relevant to transmission and reception between the local device 20B and the remote devices 40B1 to 40B3 illustrated in FIG. 5 is simply referred to as a pulse.

An interval of rising times t1, t3, t5, and t7 of a pulse waveform illustrated in FIG. 6(b) is an interval ta of the reference time when phase difference detection of the phase detection unit 22 (FIG. 4) is performed. It is assumed that this time interval ta is one second interval that is the same as a pulse interval of the 1PPS signal P0. Here, the time interval ta can be variable through a multiplication operation of the 1PPS signal P0 in the multiplication unit 29 (FIG. 1).

It is assumed that the local device 20B transmits the first pulse 1 to all the first, second, and third remote devices 40B1 to 40B3 via all the optical fibers 60a to 60c at time t1 illustrated in FIG. 6(a).

The first transmission pulse 1 is received by all the remote devices 40B1 to 40B3 and the following processing is performed. That is, in the first remote device 40B1, the received pulse 1 (see FIG. 5) is converted to an electrical signal and then counted by the counter unit 45. The table unit 46 to which the count value T2="1" has been input outputs the open instruction signal J to the opening and closing switch 47 because the value is the same as the pulse number "1" received by the remote device 40B1.

With this output, the opening and closing switch 47 in the closed state is opened for a certain period to pass the pulse signal P1a and output the pulse signal P1a to the E/O conversion unit 43. The E/O conversion unit 43 converts the pulse 1 into an optical signal and sends back the optical signal to the local device 20B via the optical fiber 60a.

Meanwhile, in the other remote devices 40B2 and 40B3, because the same pulse number as the count value "1" of the pulse 1 is not stored in the table unit 46, the pulse 1 cannot pass through the opening and closing switch 47, and the pulse 1 is not sent back.

It is assumed that the pulse 1 sent back from the first remote device 40B1 via the first optical fiber 60a is received in the local device 20B at time t2 illustrated in FIG. 6(c). The reception time t2 is a time delayed from the transmission time t1 by the round-trip propagation delay time tb1 of the first optical fiber 60a. Thus, the phase difference φ1 detected by the phase detection unit 22 (FIG. 4) after the reception of the send-back pulse 1 changes depending on the round-trip propagation delay time tb1.

The phase difference φ1 obtained by transmitting the first pulse 1 is stored in the phase difference memory unit 30 in association with a first count value T1="1" of the counter unit 31.

It is assumed that a second pulse 2 is then transmitted from the local device 20B to all the remote devices 40B1 to 40B3 via all the optical fibers 60a to 60c at time t3 illustrated in FIG. 6(a).

In the first and third remote devices 40B1 and 40B3 that have received the second pulse 2, because the same pulse number as the count value "2" of the pulse 1 is not stored in the table unit 46, the pulse 2 is not sent back.

On the other hand, in the second remote device 40B2, because the count value "2" of the received pulse 2 (see FIG. 5) is the same as the pulse number "2" stored in the table unit 46, the open instruction signal J is output to the opening and closing switch 47. With this output, the pulse 2 passes through the opening and closing switch 47, is converted to an optical signal by the E/O conversion unit 43, and is then sent back to the local device 20B via the optical fiber 60b.

The pulse 2 that is sent back is received by the local device 20B at time t4 illustrated in FIG. 6(c). This reception time t4 is a time delayed from the transmission time t3 by the round-trip propagation delay time tb2 of the second optical fiber 60b. Thus, the phase difference φ1 detected by the phase detection unit 22 after the reception of the send-back pulse 2 changes depending on the round-trip propagation delay time tb2.

The phase difference φ1 obtained after the transmission of the second pulse 2 is stored in the phase difference memory unit 30 in association with the second count value "2" of the counter unit 31.

It is assumed that a third pulse 3 is then transmitted from the local device 20B to all the remote devices 40B1 to 40B3 via all the optical fibers 60a to 60c at time t5 illustrated in FIG. 6(a).

In the first and second remote devices 40B1 and 40B2 that have received the third pulse 3, because the same pulse number as the count value "3" of the pulse 3 is not stored in the table unit 46, the pulse 3 is not sent back.

On the other hand, in the third remote device 40B3, because the count value "3" of the received pulse 3 (see FIG. 5) is the same as the pulse number "3" of the table unit 46, the pulse 2 passes through the opening and closing switch 47 opened according to the open instruction signal J, is converted to an optical signal by the E/O conversion unit 43, and is sent back to the local device 20B via the optical fiber 60b.

The pulse 3 that is sent back is received by the local device 20B at time t6 illustrated in FIG. 6(c). This reception time t6 is a time delayed from the transmission time t5 by the round-trip propagation delay time tb3 of the third optical fiber 60C. Thus, the phase difference φ1 detected by the phase detection unit 22 after the reception of the send-back pulse 3 changes depending on the round-trip propagation delay time tb3.

The phase difference φ1 obtained after the transmission of the third pulse 3 is stored in the phase difference memory unit 30 in association with the third count value T1 "3" of the counter unit 31.

Then, the local device 20B transmits a fourth pulse 4 to the remote devices 40B1 to 40B3 via all the optical fibers 60a to 60c at time t8. In the transmission of the fourth pulse 4, the phase difference φ1 associated with the first count value "1" stored in the table unit 32 is output to the variable delay units 24 and 25 on the transmission and reception side. The variable delay unit 24 on the transmission side delays the transmission pulse 4 from a reference time t7, which is an original transmission time, by a time tc depending on the phase difference φ1. At time t8 after the adjustment through this delay, the transmission pulse 4 is transmitted to all the optical fibers 60a to 60n.

In the second and third remote devices 40B1 and 40B3 that have received the fourth pulse 4, because the same pulse number as the count value "4" of the pulse 4 is not stored in the switching table unit 46, the pulse 4 is not sent back.

On the other hand, in the first remote device 40B1, because the count value "4" of the received pulse 4 is the same as the pulse number "4" in the switching table unit 46, the pulse 4 passes through the opening and closing switch 47 opened according to the open instruction signal J, is converted to an optical signal, and is sent back to the local device 20B via the optical fiber 60b.

It is assumed that the pulse 4 that is sent back is received by the local device 20B at time t9 illustrated in FIG. 6(c). This reception time t9 is a time delayed from an original transmission time t7 by a time td obtained by adjusting the round-trip propagation delay time tb1 of the first optical fiber 60a with the delay time tc at the time of transmission. When this adjustment is continuously performed, the phase difference φ1 becomes 0 or constant, and the local device 20B and the first remote device 40B1 are time-synchronized. This also applies to the other remote devices 40B2 and 40B3.

Further, the count value T1="4" obtained by counting a send-back pulse 2 received at time t9 and demodulated is input to the phase difference memory unit 30. The phase difference memory unit 30 stores the count value "4" indicating the first optical fiber 60a and the phase difference φ1 in association with each other. The same operation is then performed.

Effects of Second Embodiment

Effects of the time synchronization system 10B according to the second embodiment will be described. The time synchronization system 10B includes the local device 20B that modulates the carrier signal C0 at a predetermined frequency with the 1PPS signal P0, converts the carrier signal C0 to the optical pulse signal P2, and transmits the optical pulse signal P2 to the optical fiber 60, and the remote device 40B that receives the optical pulse signal P2 from the optical fiber 60 and sends back the optical pulse signal P2 to the local device 20B via the optical fiber 60. The local device 20B establishes time synchronization with the remote devices 40B1, 40B2, and 40B3 based on characteristics to be described below. The local device 20B delays the pulse signal P1 using the variable delay unit to perform the adjustment so that the phase difference φ1 between the demodulated carrier signal Cob and the carrier signal C0 before modulation to be described below is 0 or constant. Here, the carrier signal C0b is obtained by demodulating the optical pulse signal P2 that is sent back using the PPS demodulation unit 23 after performing conversion to an electrical signal on the optical pulse signal P2. Here, the phase difference φ1 is detected by the phase detection unit 22. The time synchronization system 10B has the following characteristic configuration.

The local device 20B includes the distribution unit 34, the counter unit 31, the phase difference memory unit 30, and the opening and closing switch 47.

The distribution unit 34 connects the plurality of remote devices 40B1 to 40Bn using the individual optical fibers 60a to 60n, and transmits optical pulse signals to all the remote devices 40B1 to 40Bn via the connected optical fibers 60a to 60n at the same time.

The counter unit 31 counts the pulse signal P1d demodulated by the PPS demodulation unit 23 and outputs the count value T1.

The phase difference memory unit 30 stores the count value T1 as information of the optical fibers 60a to 60n in association with the phase difference φ1 detected by the phase detection unit 22, and outputs the phase difference φ1 associated with the stored information on the optical fibers 60a to 60n to the variable delay unit when the count value T1 indicating the same information of the optical fibers 60a to 60n is input.

The remote devices 40B1 to 40Bn demodulate the pulse signal P1a obtained by converting the optical pulse signal P2 received from the optical fibers 60a to 60n to an electrical signal, to obtain the carrier signal C0a.
The counter unit 45 counts the pulse signal P1a subjected to conversion to an electrical signal and outputs a count value.

The switching table unit 46 stores the pulse number (for example, "1") that is the arrangement order of the pulse signals received by the remote device (for example, the first remote device 40B1), and outputs the open instruction signal J when the count value "I" of the same number as the stored pulse number "1" is input from the counter unit 45.

The opening and closing switch 47 is normally closed, and is opened for a certain period to pass the pulse signal P1a after conversion to an electrical signal when the open instruction signal J is input. The passed pulse signal P1a is sent back to the local device 20B via the same optical fiber 60a as at the time of transmission from the local device 20B.

With this configuration, in the remote device (for example, the remote device 40B1), only when the count value "1" of the received pulse signal P1a is the same as the pulse number "1" stored in the switching table unit 46, the received pulse signal P1a passes through the opening and closing switch 47 opened according to the open instruction signal J and is sent back to the local device 20B. In this case, in the other remote devices 40B1 to 40Bn, because the same pulse number as the count value "1" is not stored in the table unit 46, the send-back is not performed. That is, when one pulse signal P1 is transmitted to all the remote devices 40B1 to 40Bn, send-back of the pulse signal P1a is performed in only the remote devices 40B1 to 40Bn corresponding to the pulse signal P1.

The following operation is performed in the local device 20B. It is assumed that, for example, the pulse signal P1 is transmitted to all the optical fibers 60a to 60n and the pulse signal P1a is sent back from only the first remote device 40B1 to the local device 20B via the first optical fiber 60a. The local device 20B stores the count value "1" of the pulse signal P1a that is sent back in the phase difference memory unit 30 as the information on the optical fibers 60a to 60n in association with the phase difference φ1.

Thereafter, when the pulse signal P1a is sent back again from the first remote devices 40B1 to 40Bn via the first optical fibers 60a to 60n, the transmission pulse signal P1 is delayed depending on the previously stored phase difference φ1 of the first optical fiber 60a, and the phase difference φ1 detected this time approaches 0 or a constant value. When this process is executed a plurality of times, the phase difference φP detected by the phase detection unit 22 becomes 0 or constant and time synchronization between the local device 20B and the first remote device 40B1 can be established. Similarly, it is possible to establish time synchronization among all the remote devices 40B1 to 40Bn.

Because this time synchronization is performed by connecting the plurality of remote devices 40B1 to 40Bn to one local device 20B with the individual optical fibers 60a to 60n, it is not necessary to use as many local devices 20B as the plurality of remote devices 40B1 to 40Bn, unlike the case of the known art. Thus, it is possible to reduce an equipment cost of the entire time synchronization system.

Application Example

Next, an example in which the time synchronization system 10A of the first embodiment or the time synchronization system 10B of the second embodiment described above is applied to a mobile communication system will be described. Here, an example in which the time synchronization system 10A is applied to the mobile communication system will be described in this application example.

Figure 7:
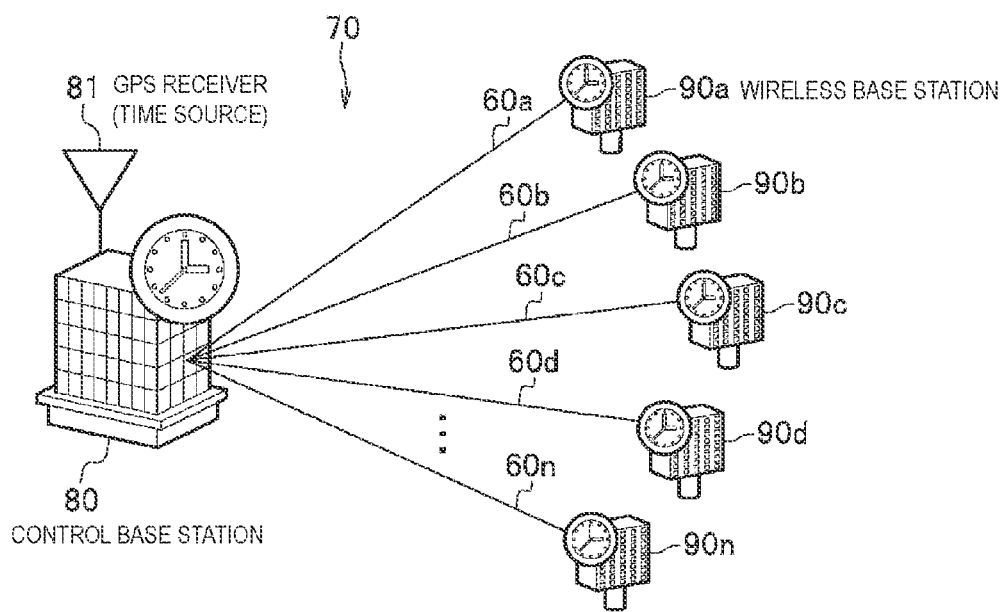
FIG. 7 is a diagram illustrating a configuration of a mobile communication system to which the time synchronization system of the first embodiment is applied.

FIG. 7 is a diagram illustrating a configuration of a mobile communication system 70 to which the time synchronization system 10A is applied.

In the mobile communication system 70, a plurality of wireless base stations 90a, 90b, 90c, 90d, . . . , 90n are connected to one control base station 80 via individual optical fibers 60a to 60n.

The control base station 80 includes the local device 20A (FIG. 1) of the time synchronization system 10A. The wireless base stations 90a to 90n include remote devices 40A1 to 40An (FIG. 1), respectively. For example, it is assumed that the wireless base station 90a includes the remote device 40A1, the wireless base station 90b includes the remote device 40A2, . . . , and the wireless base station 90n includes the remote device 40An.

The control base station 80 includes a GPS receiver 81 serving as a time source that receives radio waves from a Global Positioning System (GPS) and extracts time information. The 1PPS signal P0 (FIG. 1) and the carrier signal C0 are output from the GPS receiver 81 to the local device 20A mounted in the control base station 80.

A pulse signal is transmitted from the control base station 80 via the optical fibers 60a to 60n, received by each of the wireless base stations 90a to 90n, and sent back to the control base station 80 via the same optical fibers 60a to 60n, so that time synchronization is established between the control base station 80 and each of the wireless base stations 90a to 90n, as described above.

Figure 8:
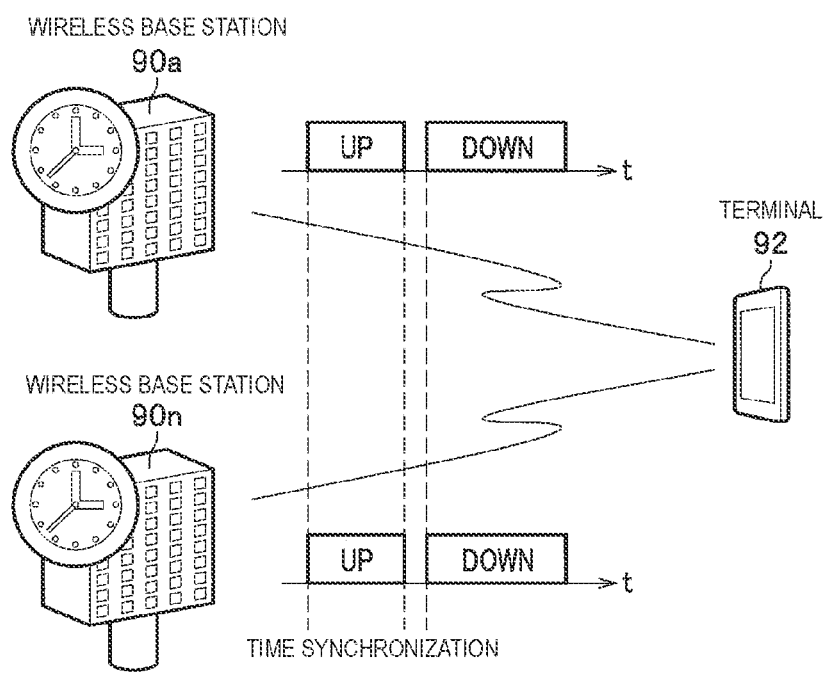
FIG. 8 is a diagram illustrating upstream and downstream wireless communication between a wireless base station and a mobile terminal in the mobile communication system.

The wireless base stations 90a to 90n and a mobile terminal 92 such as a mobile phone or a smartphone perform upstream and downstream wireless communication, as illustrated in FIG. 8. At present, as this wireless communication, a time division duplex system in which wireless communication is performed by using different frequencies so that upstream radio waves and downstream radio waves do not interfere with each other is applied. The application of the time synchronization system 10A allows communication to be performed in time division with upstream as a first time and downstream as a second time, using the same frequency for upstream (UP) and downstream (DOWN).

Figure 9:
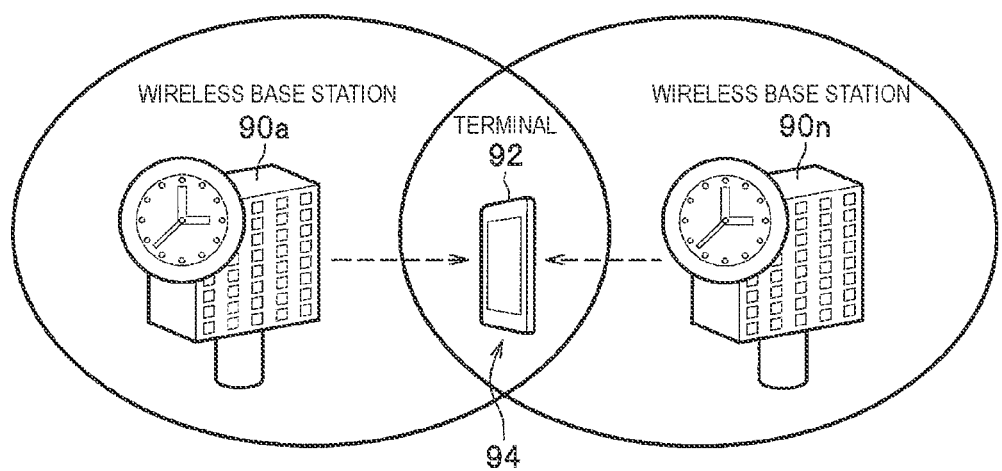
FIG. 9 is a diagram illustrating a state in which a terminal is present in a cell overlapping portion of a plurality of wireless base stations in the mobile communication system.

FIG. 9 is a diagram illustrating a state in which the terminal 92 is present in a portion (cell overlapping portion)

94 in which cells due to radio waves of the wireless base station 90a and the wireless base station 90n overlap. In this case, in the cell overlapping portion 94, a throughput of the terminal 92 decreases due to radio wave interference or the like. Thus, a transmission timing is coordinated between the wireless base stations 90a and 90n under inter-base station coordination control so that reception power of the terminal 92 is increased. The time synchronization with the wireless base stations 90a and 90n is established under time synchronization control of the control base station 80. Thus, each of the wireless base stations 90a and 90n can transmit radio waves at a transmission timing such that radio waves become strong in the cell overlapping portion 94.

Figure 10:
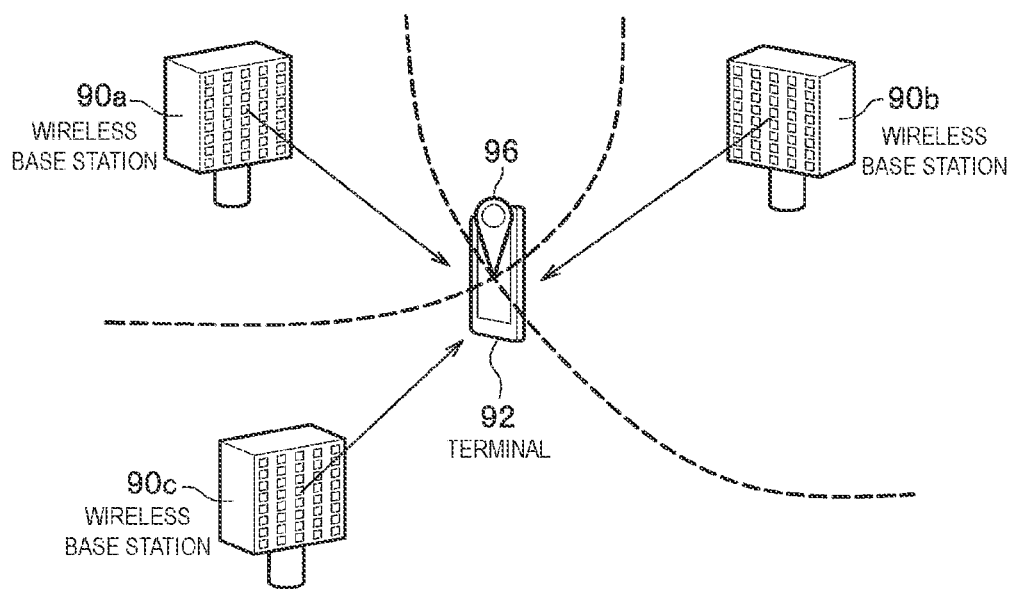
FIG. 10 is a diagram illustrating a configuration in which the terminal measures a position of the terminal itself by receiving radio waves from a plurality of wireless base stations in the mobile communication system.

FIG. 10 is a diagram illustrating a configuration when the terminal 92 measures a position 96 of the terminal 92 by receiving radio waves from the plurality of wireless base stations 90a to 90c.

Signals are wirelessly transmitted at the same timing from the plurality of wireless base stations 90a to 90c synchronized by an upper control base station 80, and the terminal 92 detects an arrival time of each signal and measures a position of the terminal 92. For example, because the terminal 92 receives a signal from the wireless base station 90a, receives a signal from the wireless base station 90b, and further receives a signal from the wireless base station 90c to recognize a distance relationship from three time relationships, the position of the terminal 92 can be measured. Because the distance relationship can be recognized even from two time relationships, the position of the terminal 92 can be measured.

In addition, a specific configuration can be appropriately changed without departing from the gist of the present disclosure.

REFERENCE SIGNS LIST 10A, 10B Time synchronization system
20A, 20B Local device
21 PPS modulation unit
22 Phase detection unit
23,44 PPS demodulation unit (demodulation unit)
24, 25 Variable delay unit
26,43 E/O conversion unit
27,42 O/E conversion unit
28,41 Circulator
29 Multiplication unit
30 Phase difference memory unit
31, 45 Pulse counter unit
32,46 Switching table unit
33 Path switching unit
34 Distribution unit
40A1 to 40An and 40B1 to 40Bn remote device
47 Opening and closing switch
60a to 60n Optical fiber

The invention claimed is:

1. A time synchronization system comprising:
a local device configured to convert a first carrier signal into an optical pulse signal after modulating with a first pulse signal at equal intervals, and transmit the optical pulse signal to a path of an optical fiber, and
a remote device configured to receive the optical pulse signal from the path and then send back the optical pulse signal to the local device via the path,
wherein the local device delays a modulated pulse signal to be transmitted using a variable delay unit so that a phase difference between a second carrier signal obtained by demodulating the optical pulse signal that is sent back using a demodulation unit after an electrical conversion and the first carrier signal before a modulation becomes 0 or constant phase difference detected by a phase detection unit, such that time synchronization between the local device and the remote device is established, and
wherein the local device comprises:
a path switching unit configured to connect a plurality of the remote devices using a plurality of paths of individual optical fibers and sequentially switch among the plurality of the paths that are connected in a predetermined cyclic order;
a counter unit configured to count a second pulse signal demodulated by the demodulation unit and output a count value;
a phase difference memory unit configured to store the count value as path information in association with the phase difference detected by the phase detection unit, and output, when a count value is input, the phase difference associated with the path information, that is stored, indicated by the count value that is input to the variable delay unit; and
a switching table unit configured to output a path switching signal for switching to a next path in the cyclic order to the path switching unit when the count value is input.

2. The time synchronization system according to claim 1, wherein the local device further includes a multiplication unit configured to multiply a frequency of the first pulse signal for modulating the first carrier signal.

3. A time synchronization method for a time synchronization system comprising:
a local device configured to convert a first carrier signal at a predetermined frequency into an optical pulse signal after modulating with a first pulse signal at equal intervals, and transmit the optical pulse signal to a path of an optical fiber, and
a remote device configured to receive the optical pulse signal from the path and then send back the optical pulse signal to the local device via the path, the local device delaying a modulated pulse signal to be transmitted using a variable delay unit so that a phase difference between a second carrier signal obtained by demodulating the optical pulse signal that is sent back using a demodulation unit after an electrical conversion and the first carrier signal before a modulation becomes 0 or constant phase difference detected by a phase detection unit, such that time synchronization between the local device and the remote device is established,
the time synchronization method comprising:
connecting, by the local device, a plurality of the remote devices using a plurality of paths of individual optical fibers and sequentially switching among the plurality of the paths that are connected in a predetermined cyclic order;
counting, by the local device, a second pulse signal demodulated by the demodulation unit and outputting a count value;
storing, by the local device, the count value as path information in association with the phase difference detected by the phase detection unit, and outputting, when a count value is input, the phase difference associated with the path information, that is stored, indicated by the count value that is input to the variable delay unit; and performing, by the local device, switching to a next path in the cyclic order when the count value is input.

4. A time synchronization method for a time synchronization system comprising:
- a local device configured to convert a first carrier signal into an optical pulse signal after modulating with a first pulse signal at equal intervals, and transmit the optical pulse signal to a path of an optical fiber, and
- a remote device configured to receive the optical pulse signal from the path and then send back the optical pulse signal to the local device via the path, the local device delaying a modulated pulse signal to be transmitted using a variable delay unit so that a phase difference between a second carrier signal obtained by demodulating the optical pulse signal that is sent back using a demodulation unit after an electrical conversion and the first carrier signal before a modulation becomes 0 or constant phase difference detected by a phase detection unit, such that time synchronization between the local device and the remote device is established, the time synchronization method comprising:
  - connecting, by the local device, a plurality of the remote devices using a plurality of paths of individual optical fibers and simultaneously transmitting the optical pulse signal to all of the plurality of the remote devices via each of the plurality of the paths that are connected;
  - counting, by the local device, a second pulse signal demodulated by the demodulation unit and outputting a first count value;
  - storing, by the local device, the first count value as path information in association with the phase difference detected by the phase detection unit, and outputting, when a first count value is input, the phase difference associated with the path information, that is stored, indicated by the first count value that is input to the variable delay unit;
  - demodulating, by the remote device, a third pulse signal obtained by electrically converting the optical pulse signal after receiving from the path to obtain the first carrier signal;
  - counting, by the remote device, the third pulse signal obtained by electrically converting the optical pulse signal from the path and outputting a second count value;
  - storing, by the remote device, a pulse number, the pulse number being an arrangement order of pulse signals received by the remote device itself, and outputting an open instruction signal when a second count value of an identical number with the pulse number that is stored is input;
  - causing, by the remote device, the third pulse signal after the electrical conversion to pass through an opening and closing switch configured to be in a closed state normally and in an open state for a certain period when the open instruction signal is input; and
  - sending, by the remote device, the third pulse signal back that is passed to the local device via the path identical with the path at a time of transmission from the local device.

\* \* \* \* \*